(12) United States Patent
Gibbon et al.

(10) Patent No.: US 6,582,080 B2
(45) Date of Patent: Jun. 24, 2003

(54) IMAGE PROJECTION SYSTEM

(75) Inventors: Michael A. Gibbon, Oakville (CA); Steven C. Read, Mississauga (CA); Sean M. Adkins, Vancouver (CA)

(73) Assignee: Imax Corporation (CA)

( * ) Notice: Subject to any disclaimer, the term of this patent is extended or adjusted under 35 U.S.C. 154(b) by 0 days.

(21) Appl. No.: 10/060,744

(22) Filed: Jan. 30, 2002

(65) Prior Publication Data

US 2002/0140906 A1 Oct. 3, 2002

Related U.S. Application Data

(63) Continuation-in-part of application No. 10/031,839, filed as application No. PCT/CA00/00800 on Jul. 6, 2000, now abandoned.

(30) Foreign Application Priority Data

Jul. 19, 1999 (CA) .............................................. 2277656

(51) Int. Cl.[7] .............................................. G03B 21/14
(52) U.S. Cl. ............................................ 353/20; 353/31
(58) Field of Search .............................. 353/20, 30, 31, 353/33, 81

(56) References Cited

U.S. PATENT DOCUMENTS 6,183,090 B1 * 2/2001 Nakanishi et al. .............. 349/9
6,250,762 B1 * 6/2001 Kuijper ........................ 353/20

OTHER PUBLICATIONS

International Application No. PCT/CA00/00800 to Gibbon et al., published Jan. 25, 2001.*

* cited by examiner

*Primary Examiner*—Russell Adams
*Assistant Examiner*—Michelle Nguyen
(74) *Attorney, Agent, or Firm*—Dean W. Russell; Michael J. Turton; Kilpatrick Stockton LLP

(57) ABSTRACT

An electronic projector has a projection system that includes a spatial light modulator (SLM) for imparting image information to the projected light beam. The light beam leaving the SLM is prepolarized in a defined orientation and the projected light is polarized in the same orientation so as to effectively block any light that has been scattered within the projector and become depolarized. The SLM may be a digital mirror device (DMD). Reflective surfaces within the projector may be covered or coated with material that alters the polarization of reflected stray light from the defined orientation or depolarizes the reflected stray light.

20 Claims, 4 Drawing Sheets

IMAGE PROJECTION SYSTEM

RELATED APPLICATIONS

This application is a continuation-in-part of U.S. patent application Ser. No. 10/031,839 entitled "Image Projection System" which was filed under 35 U.S.C. §371 on Jan. 22, 2002 now abandoned as the U.S. national phase entry of International Application No. PCT/CA00/00800 filed Jul. 6, 2000 and claims priority to Canadian Application No. 2,277,656, which was filed on Jul. 19, 1999.

FIELD OF THE INVENTION

This invention relates generally to image projection systems, and is concerned more particularly with systems that include a spatial light modulator (SLM) for imparting image information to a projected light beam. Systems of this type typically are used for large screen televisions, which are often referred to as "electronic projectors".

BACKGROUND OF THE INVENTION

In a typical electronic projector, the SLM may be a liquid crystal device (LCD) comprising a matrix of individually addressable liquid crystal pixels. Each pixel can be switched between a transmissive mode in which incident light from the light source passes through the pixel and is projected, and a non-transmissive mode. In the non-transmissive mode, the light may be absorbed or reflected away from the projection lens. In any event, each pixel has an "on" state and an "off" state. By appropriately controlling the pixels in accordance with stored data, image information is imparted to the projected light beam.

U.S. Pat. No. 5,584,991 (Levis et al.) discloses an example of a LCD projection system.

Another example of an SLM that includes an active matrix of pixels is known as a deformable (or digital) mirror device (DMD). In this case, the matrix comprises an array of tiltable mirrors, each of which positioned on a hinge element above electrodes that allow the mirror to be electrostatically deflected between two positions. The device is operated in a binary manner so that each mirror switches between an "on" state and a "off" state. The mirror angularly deflects the incident light beam so that the beam is either reflected through the projector optics, or not.

U.S. Pat. No. 5,061,049 (Hornbeck) discloses an example of a DMD device, which is hereby incorporated in its entirety by reference. U.S. Pat. No. 5,535,047 (Hornbeck) discloses further improvements to the DMD device of U.S. Pat. No. 5,061,049 and is hereby incorporated in its entirety by reference.

Known projection systems for producing 3D images in which light from a light source is modulated by an SLM and then polarized suffer the disadvantage that there is often a limit on the amount of light flux that can be directed onto the SLM. This limit is caused by, for example, limitations associated with the heating effect of the radiant flux, or saturation due to high luminous flux. This limit prevents increasing the light flux directed onto the SLM to overcome the losses introduced by the polarization of the light leaving the SLM.

Another problem with SLMs is that there is a tendency for some of the incident light to be scattered or reflected, which reduces the overall contrast of images projected onto the screen.

An object of the present invention is to address these disadvantages with the aim of improving the contrast of the projected images.

SUMMARY OF THE INVENTION

The present invention addresses the improvement of contrast in electronic projectors utilizing DMDs by reducing the amount of scattered light that reaches the projection screen. The contrast improvement results from polarizing the input light to the DMD and selecting appropriate materials and surface treatments for the projector's components so that the unwanted reflection and diffraction effects that produce scattered light also depolarize or change the orientation of the polarization of the light. This allows a second polarizer at the output of the projection optics to discriminate between the desired light and the unwanted scattered light. For 3D applications, polarizing the light before the DMD reduces the heat load on the DMD, this allows higher illumination levels to be used to compensate for the loss of brightness due to polarization. The DMD can be operated within its stress ratings and illuminated to the maximum level by polarized light.

Generally speaking, the first polarizer means pre-polarizes or "characterizes" the light. Light that is subsequently scattered within the projector and depolarized will be partially blocked (up to a maximum of 50%) by the second polarizer means. Accordingly, the contrast ratio of the projected image will be increased by a factor of up to 2.

This is distinct from systems such as LCD projectors where the use of polarized light is essential in order to obtain pixel intensity control from the electrically alterable polarization property of the liquid crystal medium. In LCD projectors, the input light to the LCD is polarized, either prior to the LCD or by a polarizer that is integral to the LCD assembly. A second polarizer then analyzes the output light of the LCD according to the amount of alteration performed by the LCD on the input polarization.

Projectors based on DMD devices do not require polarized light. The use of polarization with DMD devices has been thought of as undesirable as it reduces by half the amount of light that the projection system can deliver to the screen. However, in a system for projection of 3D images, two sets of images are produced, one for each eye, and are characterized or coded by orthogonally polarized light. In a traditional system, the light is usually polarized after the projector lens, resulting in an efficiency loss of roughly 50%. This loss of efficiency requires high input light levels to be used, which can lead to excessive heating of the DMDs. This invention avoids this excessive heating by polarizing the light before the DMDs in the projector, therefore reducing the radiant flux and associated heating of the DMD.

An advantage of the invention is that it is somewhat easier to characterize the unwanted "noise" (scattered light) by polarization than by trying to characterize the signal in some other way. Inefficiencies in the polarizing material are below significance since the amount of noise is relatively small compared to the signal. Inefficiencies such as inequities in performance depending on wavelength or angle of incidence can be tolerated much more readily when applied to the noise component of the overall signal.

Additional significant improvements in the contrast ratio of the projected image are obtained by controlling the surface properties of materials used within the projector where light may be scattered so that those surface properties will further rotate the polarization or depolarize the stray or unwanted light when it is reflected from those surfaces.

BRIEF DESCRIPTION OF DRAWINGS

In order that the invention may be more clearly understood, reference will now be made to the accompanying drawings which illustrate a preferred embodiment of the invention by way of example, and in which.

DESCRIPTION OF PREFERRED EMBODIMENT

Figure 1:
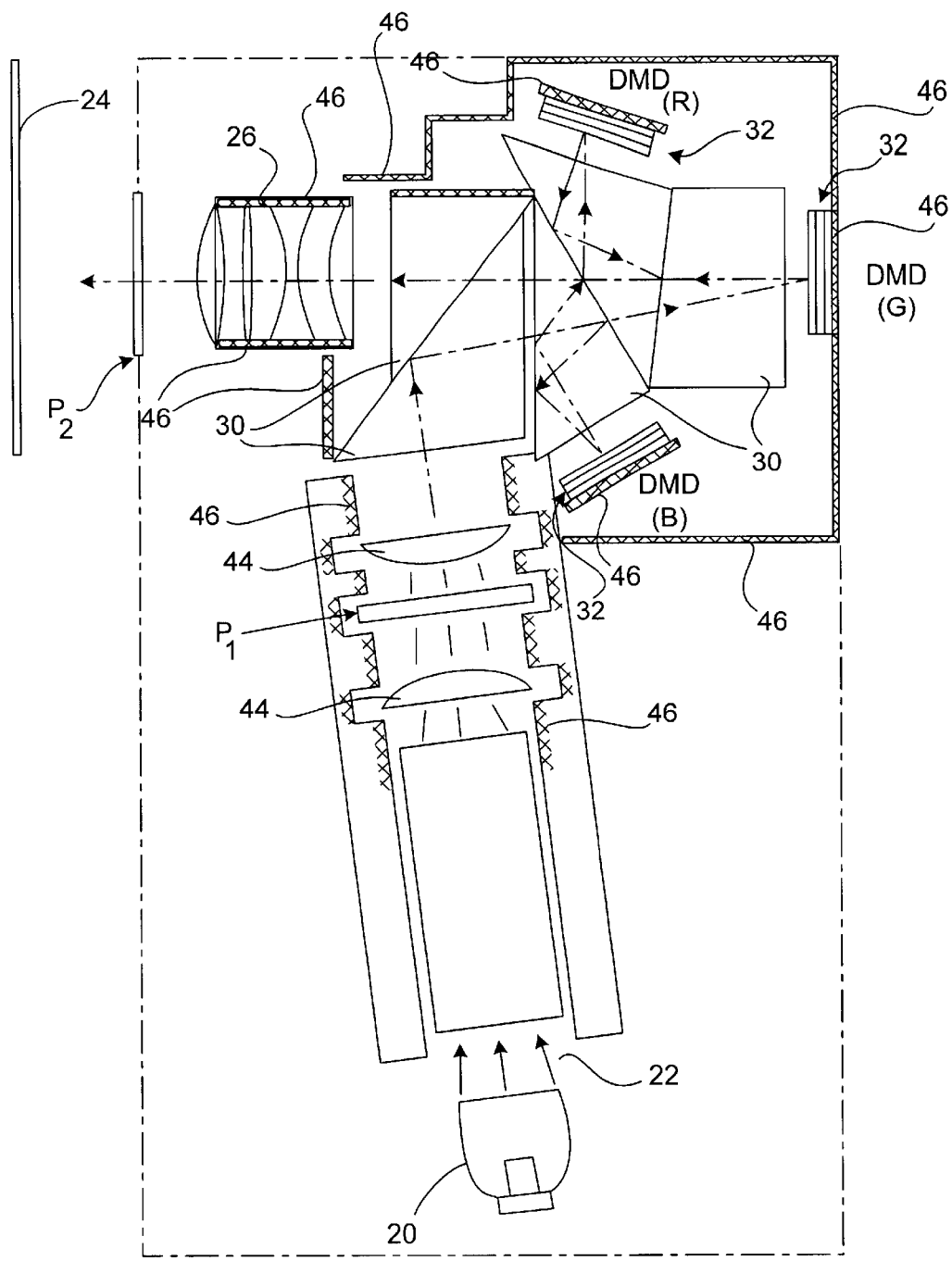
FIG. 1 is a schematic illustration of an electronic projector in accordance with a preferred embodiment of the invention.

FIG. 1 illustrates schematically the principal components of a projection system in accordance with the invention. Reference numeral 20 denotes a light source that projects a beam of light 22 onto a projection screen 24 via a projection lens 26. The light source 20, projection lens 26 and screen 24 are essentially conventional. Also conventional is a beamsplitter arrangement comprising an assembly of prisms 30 that optically splits the light beam 22 into red, green and blue components (R, G, B). The respective components are directed by the beamsplitter to three corresponding DMDs 32.

The DMDs are essentially identical but deal with different portions of the spectrum. In other words, the light that enters the beamsplitter is split into red, green and blue components which are delivered to the respective R, G and B DMDs. The beamsplitter then in effect "re-assembles" the R, G and B components of the light beam and directs them together into the projection lens 26 for projection onto the screen 24.

Each of the DMDs 32 comprises an array of reflective digital light switches (mirrors) that are integrated onto a silicon chip capable of addressing the switches individually. Each switch represents a single pixel in the array and can be individually switched on or off in accordance with digital information that is provided to the chip by an appropriate hardware and software controller. Each individual pixel in each DMD is controlled to impart appropriate image information to the light beam that is projected onto the screen 24.

Figure 2:
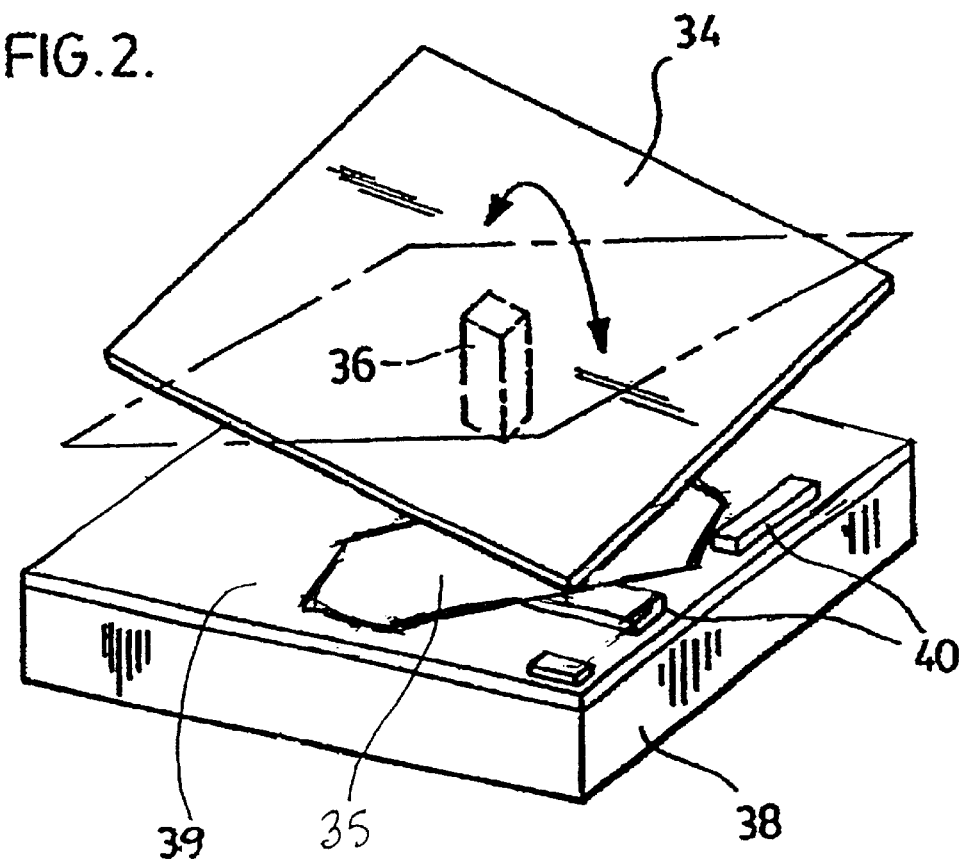
FIG. 2 is a schematic perspective view of a pixel of a DMD that may be used in the projector of FIG. 1.

FIG. 2 shows a single one of the mirrors of a DMD and part of the silicon chip used to control the mirrors. Since DMDs are known, detailed information with respect to the construction and operation of the DMD is not provided. Reference may be made to the U.S. Pat. No. 5,061,049. For present purposes, it is sufficient to note that FIG. 2 shows the mirror at 34 and that the mirror is mounted at the outer end of a post 36 mounted on a hinge and yoke structure (not shown) above electrodes 35 that allow the element to be electrostatically deflected between two tilted positions, in which the mirror either reflects light into the projection lens 26 (FIG. 1) or away from the projection lens. In FIG. 2, the mirror is shown in full lines in one of its tilted positions and in ghost outline in the other of its tilted positions.

A portion of the silicon chip on which the mirror is mounted is denoted by reference numeral 38. The chip includes individual memory cells, one for controlling each mirror. By virtue of the construction of the DMD, the top surface 39 of the chip 38 below each mirror has surface portions that are at different elevations and have a variety of different irregular shapes, as indicated generally by reference 40 in FIG. 2. Gaps between each mirror that are inherent in the construction of the DMD mirror array allow light to reach this top surface. Some of this light is reflected from the top surface 39, which causes scattered light. Pursuant to an aspect of the invention that is to be described later, the under-mirror substrate layer 39 and some of the elevated surface portions 40 are treated or coated with a material that has the property of further rotating the polarization or depolarizing the light that is reflected from that surface.

In accordance with a primary aspect of the invention, the projection system includes first polarizer means for polarizing, in a defined orientation, light input to each DMD and second polarizer means for polarizing, in the same defined orientation, light after it has passed through the projection lens. The first polarizing means pre-polarizes or "characterizes" the light in a defined orientation. Light that is subsequently scattered within the projector is altered in polarization or depolarized by the surface properties of the projector components. The scattered light is then blocked by the second polarizer means and will not impair the contrast of the images that are projected onto the screen.

In the embodiment shown in FIG. 1, the first polarizer means is indicated by a polarizing filter P1 in the beam of light that enters the beamsplitter from the light source 20. For example, the polarizer may be positioned between lens elements 44 that configure the light beam appropriately before the light enters the beamsplitter. In this way, the light is pre-polarized or "characterized" by polarizer P1.

Polarizer P2 is also a polarizing filter and in this embodiment is positioned at the outer end of projection lens 26. Polarizer P2 has a defined orientation that is the same as the defined orientation of polarizer P1. Accordingly, polarizer P2 will block and prevent projection onto the screen of any light that has become de-polarized or altered in polarization as the light beam passed through the optical system of the projector. It will of course be understood that polarizer P2 could be located, for example, prior to the projection lens or within the projection lens 26 (e.g. between the lens element of the projection lens).

Similarly, the location of polarizer P1 can change. Preferably, the light is pre-polarized before it reaches the SLM(s) of the projection system. However, it is important merely that the light be polarized as it leaves the SLM(s).

In summary, the arrangement of first and second polarizers provided by the invention has been found to lead to significant improvements in the contrast ratio of the images that are projected onto the screen. It has also been found that additional significant improvements in contrast ratio can be achieved by controlling the surface properties of materials used within the projector where light may be scattered so that those surface properties will further rotate the polarization or depolarize the stray or unwanted light when it is reflected from those surfaces.

Figure 3:
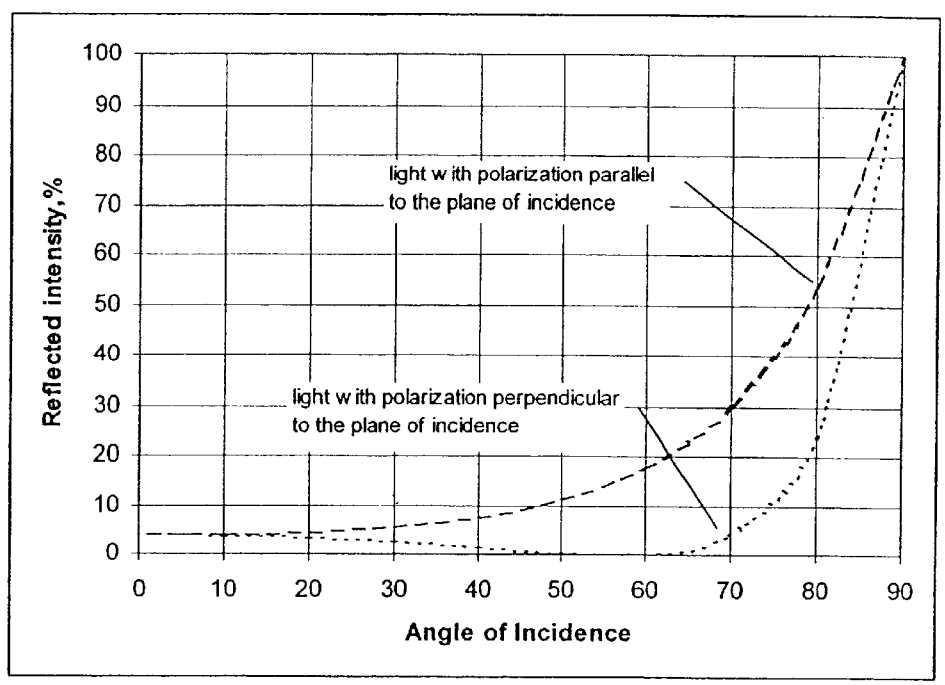
FIG. 3 shows the reflected intensity of two orientations of polarized light from a dielectric surface.
Figure 4:
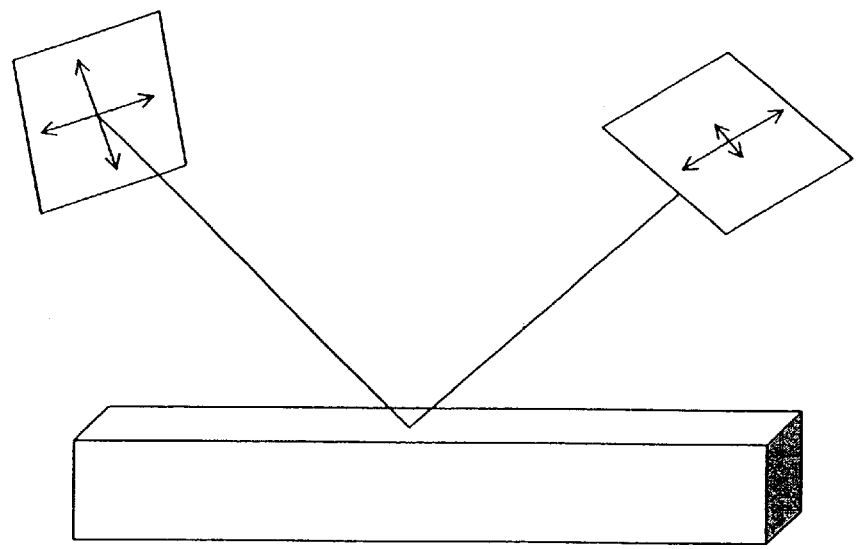
FIG. 4 illustrates the polarization states of light reflected from a dielectric surface.

It is well known that specular reflections from metallic surfaces preserve the polarization of the incident light while reflections from dielectric surfaces obey the relationship shown in FIG. 3. This figure shows that incident rays with a polarization parallel to the plane of incidence are reflected with greater efficiency than incident rays with a polarization perpendicular to the surface. This is illustrated in FIG. 4 where the orientation of polarization of the light is described according to convention by the direction of the electric field vector.

Figure 5:
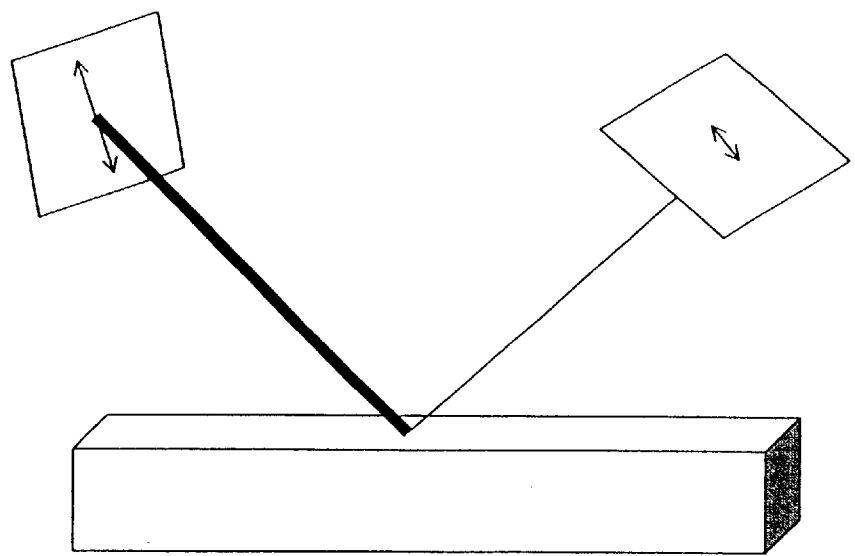
FIG. 5 illustrates the effect of using suitably coated surfaces with polarized light to reduce reflections.

In some circumstances it is possible to select dielectric materials to coat surfaces positioned in the projector so that when polarized light is incident on these surfaces it is not reflected due to the orientation of the polarization vector in the incident light. This is shown in FIG. 5. Surface coatings may also be found that rotate the polarization of the light upon reflection by for example 90 degrees.

Additionally, diffuse reflectors of both metallic and dielectric materials depolarize the incident light. Various methods for treating surfaces, such as chemical etching or micro bead blasting can be used to achieve surfaces with diffuse reflecting characteristics.

In FIG. 1, the undulating lines denoted by reference numeral 46 indicate typical areas in which such coatings or surface treatments may be applied.

One significant area is the top surface 39 of the memory chip 38 of each DMD. Thus, reverting to FIG. 2, the top surface 39 and the elevated surfaces 40 need to be coated or otherwise have properties that will further rotate the polarization or depolarize the stray or unwanted light. These surfaces then effectively screen reflection of light that may "miss" or partially miss the mirror 34 and that would otherwise give rise to significant optical noise within the projector.

An additional benefit of the invention is that it reduces the heat load on DMDs in those situations where the light output by the projector is required to be polarized in a particular orientation. This is the case for example in a 3-D projection system where two sets of images are produced, one for each eye, and are characterized or coded by orthogonally polarized light. In a traditional system, the light is usually polarized after the projector lens, resulting in an efficiency loss of roughly 50%. This loss of efficiency requires high input light levels to be used, which can lead to excessive heating of the DMDs. The invention avoids this excessive heating by polarizing the light before the DMDs in the projector, therefore reducing the radiant flux and associated heating of the SLM.

In conclusion, it should be noted that, while the preceding description relates to a particular preferred embodiment of the invention, the invention is not limited to this embodiment. A number of modifications have been indicated specifically and others would be apparent to a person skilled in the art. In addition, it should be noted that while the described embodiment relates to a projection system that includes three DMDs, projection systems can be configured using different numbers of DMDs, for example, one or two. Different configurations are possible depending on the intended application of the projection system and the characteristics that are required of the system. Generally speaking, one and two DMD systems require time multiplexing of colour.

We claim:

1. A projection system, comprising:
   a light source for producing a light beam;
   a screen;
   a projection lens for projecting the light beam onto the screen;
   a digital mirror device (DMD) for imparting image information to the light beam upstream of the projection lens;
   a first polarizer means for polarizing, in a defined orientation, light input to the DMD;
   surfaces within the projection system adapted to depolarize scattered light or alter the polarization of scattered light from the defined orientation; and
   a second polarizer means for polarizing in the same defined orientation, light passing through said projection lens.

2. A projection system as claimed in claim 1, further comprising a beamsplitter for separating said light beam into red, green and blue components and delivering the components to individual DMDs and reassembling the components into a single light beam for passage through the projection lens.

3. The projection system as claimed in claim 1, wherein at least some of the surfaces are treated to create diffuse reflective surfaces.

4. The projection system as claimed in claim 3, wherein the diffuse reflective surfaces are created by chemical etching or micro-bead blasting.

5. The projection system as claimed in claim 1, wherein the heat load on the DMD device is reduced.

6. A projection system, comprising:
   a light source for producing a light beam;
   a first polarizer for polarizing the light beam in a defined orientation;
   a digital mirror device (DMD) for imparting image information to the polarized light beam;
   surfaces within the projection system adapted to depolarize scattered light or alter the polarization of scattered light from the defined orientation;
   a screen;
   a projection lens for projecting the light beam onto the screen; and
   a second polarizer for polarizing the light beam in the defined orientation after light is reflected off the surfaces and before the light beam reaches the screen.

7. The projection system as claimed in claim 6, further comprising a beamsplitter for separating said light beam into red, green, and blue components and delivering the components to individual DMDs and reassembling the components into a single light beam for passage through the projection lens.

8. The projection system as claimed in claim 6, wherein at least some of the surfaces are treated to create diffuse reflective surfaces.

9. The projection system as claimed in claim 8, wherein the diffuse reflective surfaces are created by chemical etching or micro-bead blasting.

10. The projection system as claimed in claim 6, wherein the heat load on the DMD device is reduced.

11. A projector, comprising:
    a light source for producing a light beam;
    a first polarizer for polarizing the light beam in a defined orientation;
    a plurality of digital mirror devices (DMDs) for imparting image information to the polarized light beam;
    surfaces within the projector adapted to depolarize scattered light or alter the polarization of scattered light from the defined orientation;
    a projection lens for projecting the light beam; and
    a second polarizer for polarizing the projected light beam in the defined orientation.

12. The projector of claim 11, further comprising a beamsplitter for separating said light beam into red, green and blue components (R, G, B) and delivering the components to individual DMDs and "reassembling" the components into a single light beam for passage through the projection lens.

13. The projector as claimed in claim 11, wherein at least some of the surfaces are treated to create diffuse reflective surfaces.

14. The projector as claimed in claim 13, wherein the diffuse reflective surfaces are created by chemical etching or micro-bead blasting.

15. The projector of claim 11, wherein the heat load on the DMD device is reduced.

16. The projector of claim 11, wherein the second polarizer polarizes the light beam after the light beam is projected by the projection lens.

17. The projector of claim 11, wherein the second polarizer polarizes the light beam before the light beam is projected by the projection lens.

18. A projector, comprising:

a light source for producing a light beam;

a first polarizer for polarizing the light beam in a defined orientation;

a plurality of digital mirror devices (DMDs) for imparting image information to the polarized light beam;

surfaces within the projector adapted to depolarize scattered light or alter the polarization of scattered light from the defined orientation;

a projection lens for projecting the light beam; and a second polarizer for polarizing the projected light beam in the defined orientation and disallowing the passage of scattered light that has been depolarized or altered in polarization.

19. A projector, comprising:

a light source for producing a light beam;

a first polarizer for polarizing the light beam in a defined orientation;

a plurality of digital mirror devices (DMDs) for imparting image information to the polarized light beam;

surfaces within the projector adapted to create diffuse reflective surfaces that depolarize scattered light or alter the polarization of scattered light from the defined orientation;

a projection lens for projecting the light beam; and a second polarizer for polarizing the projected light beam in the defined orientation.

20. The projector as claimed in claim 19, wherein the diffuse reflective surfaces are created by chemical etching or micro-bead blasting.

* * * * *